United States Patent [19]
Brito

[11] Patent Number: 5,136,639
[45] Date of Patent: Aug. 4, 1992

[54] TELEPHONE HANDSET CUSHION

[76] Inventor: Ronald L. Brito, 20629 Via Verde Ave., Covina, Calif. 91732

[21] Appl. No.: 507,990

[22] Filed: Apr. 11, 1990

[51] Int. Cl.$^5$ .................. H04M 1/00; H04R 25/00
[52] U.S. Cl. .......................... 379/441; 379/447; 379/437; 379/452; 381/187
[58] Field of Search ............... 379/441, 447, 451, 437, 379/452; 381/183, 187, 189, 61, 25, 74; 181/129; D14/250

[56] References Cited

U.S. PATENT DOCUMENTS

| 1,514,152 | 11/1924 | Gernsback | 181/129 |
| 2,544,267 | 3/1951 | Konvalinka . | |
| 2,621,751 | 12/1952 | Kettler . | |
| 2,622,159 | 12/1952 | Herman | 181/129 |
| 2,669,610 | 1/1954 | Dent . | |
| 3,794,779 | 2/1974 | Greuzerd et al. | 381/183 |
| 3,938,614 | 2/1976 | Ahs . | |
| 4,005,278 | 1/1977 | Görike | 381/187 |
| 4,027,117 | 5/1977 | Nakamura . | |
| 4,160,135 | 7/1979 | Görike | 381/187 |
| 4,572,324 | 2/1986 | Fidi et al. . | |

FOREIGN PATENT DOCUMENTS

| 0274918 | 10/1969 | Austria | 381/187 |
| 0526293 | 7/1956 | Belgium | 381/187 |
| 6609007 | 11/1960 | Canada . | |
| 0585749 | 10/1933 | Fed. Rep. of Germany | 381/187 |
| 0588176 | 5/1925 | France | 381/187 |
| 0224679 | 11/1924 | United Kingdom | 381/183 |

Primary Examiner—James L. Dwyer
Assistant Examiner—Jason Chan
Attorney, Agent, or Firm—Christie, Parker & Hale

[57] ABSTRACT

A cushion for application to a telephone handset. The cushion is made from a low density, high resiliency flexible foam to make the telephone's receiver or transmitter more comfortable when pressed against the ear or mouth of the user. The cushion has a main body which defines a funnel shaped channel for guiding sound between the handset and the user. A diaphragm with sound ports completely cover the channel to dampen the sounds passing between the handset and the user. The cushion is shaped to match the receiver or transmitter of the telephone handset and can include a groove to allow the cushion to hang from a wall mounted base and tabs to conduct electricity from recharging pins to rechargeable batteries in the handset. A variety of coverings can be placed over the cushion for aesthetic or functional purposes.

8 Claims, 3 Drawing Sheets

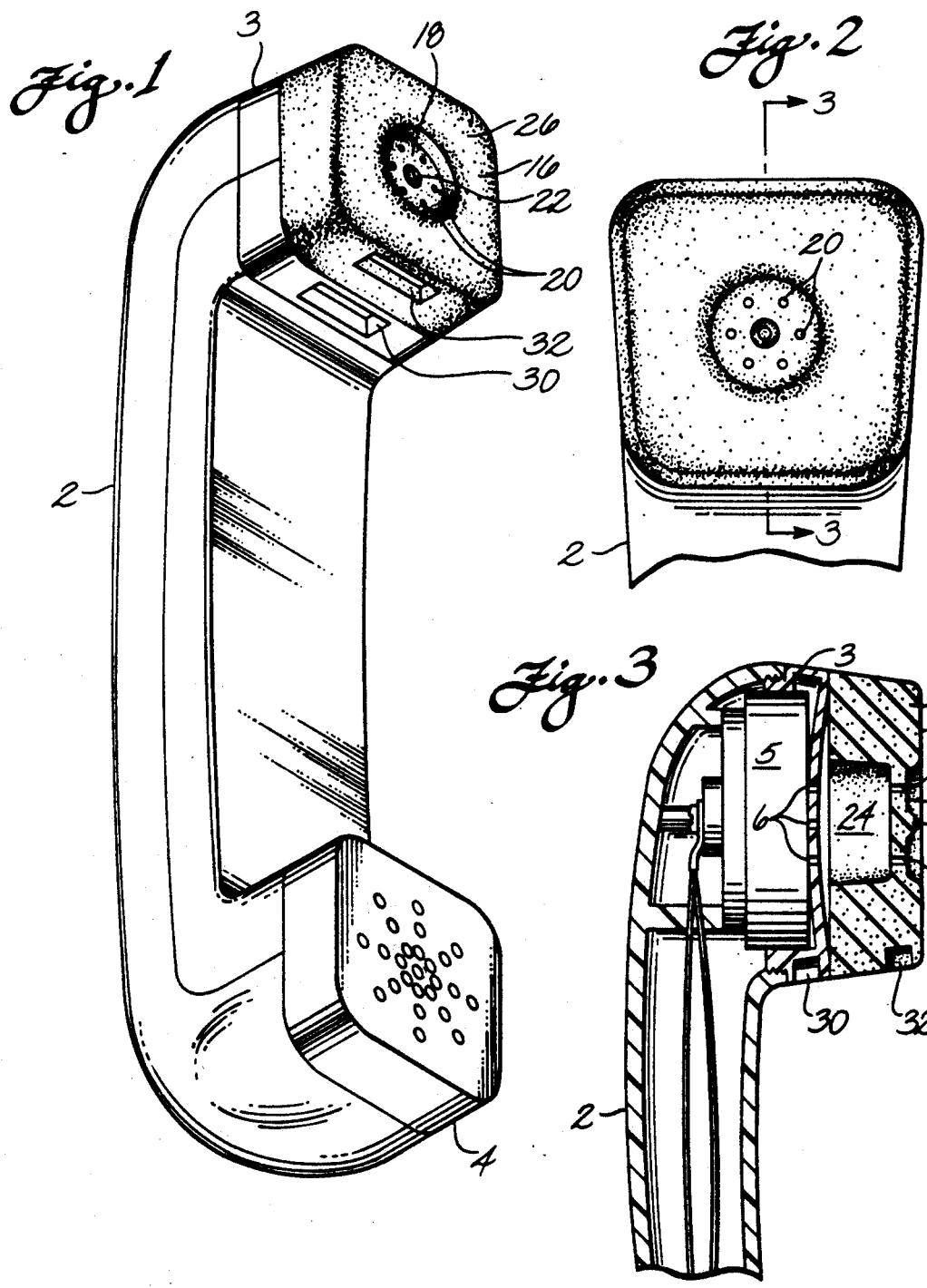

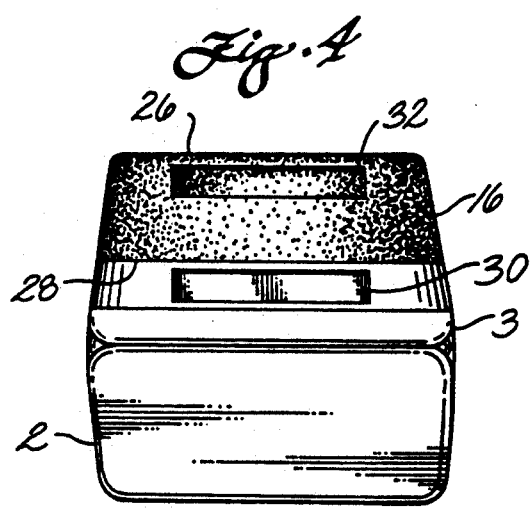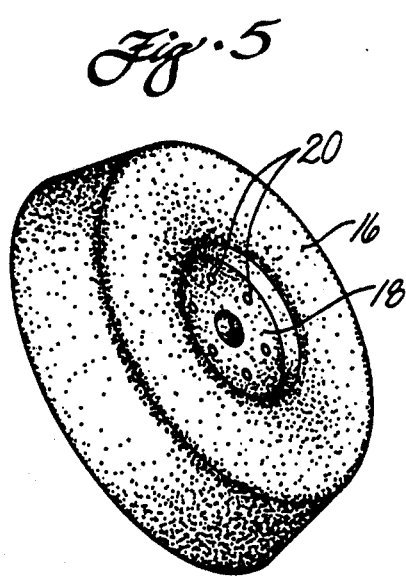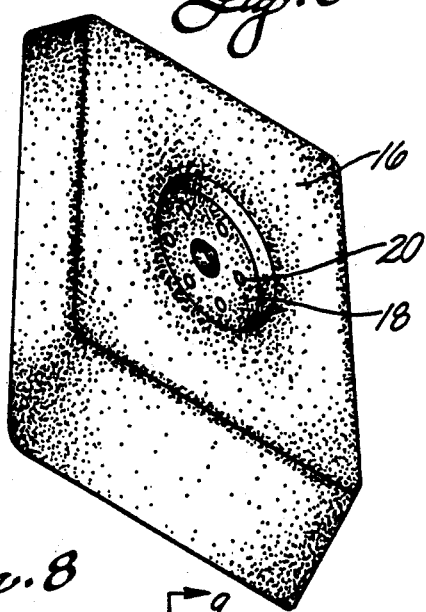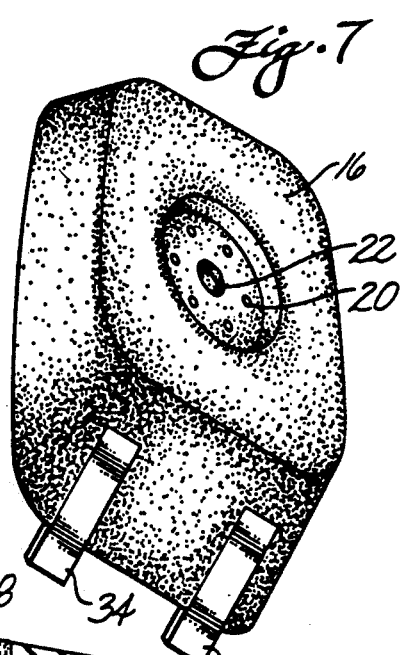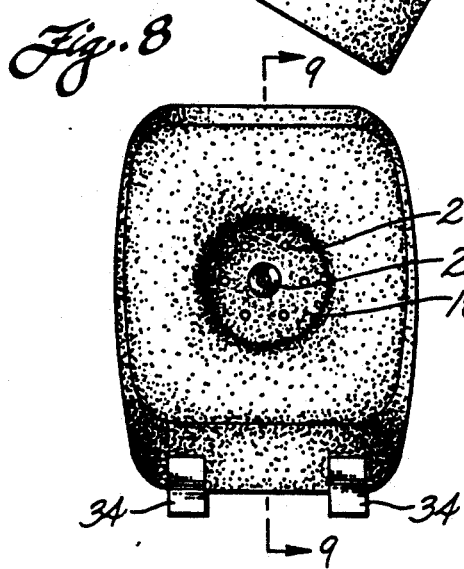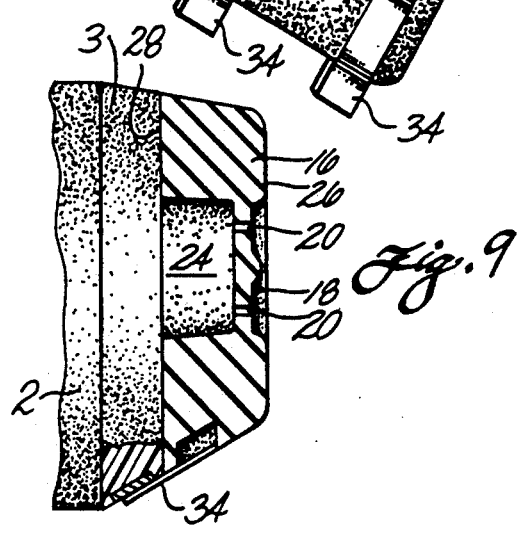

TELEPHONE HANDSET CUSHION

FIELD OF THE INVENTION

The present invention pertains to telephone handset attachments and, in particular, to a cushion for a telephone receiver or transmitter which improves the handset's comfort and audio performance.

BACKGROUND OF THE INVENTION

Cushions which are placed over the transmitter or receiver of a telephone handset are known. U.S. Pat. No. 2,669,610 to Dent and U.S. Pat. No. 2,621,751 to Kettler show caps which can be placed on the end of a telephone handset receiver to help isolate the telephone user's ear from surrounding sound or from the handset itself. However, these devices cannot be used with many of the telephones available today and do not filter the sound coming out of the receiver's speaker. In addition, they have concave surfaces with large openings which do not rest comfortably against the concave surface of a person's ear.

SUMMARY OF THE INVENTION

The present invention not only helps to better isolate surrounding noise from a telephone's speaker or microphone, but also provides a cushion. It filters and channels the sound coming in or out of a telephone handset and cooperates with the many parts of a telephone base. For example, plungers, electrical connections and hanging hooks.

In one embodiment, the invention is a cushion for application to a telephone handset having a transducer and a transducer housing with a central sound aperture for allowing the sound to pass between the user and the transducer. The cushion has a main body adapted to be attached to the transducer housing. This main body has an inner face for contacting the transducer housing and an outer face for contacting the user, as well as a channel to guide sound between the handset sound aperture and the user through the main body. There is also a diaphragm extending across the channel, having a plurality of ports for allowing sound traveling through the channel to pass through the diaphragm. Preferably, the diaphragm is proximate the main body outer face and has a reinforced portion proximate its center. This reinforced portion preferably comprises a bulge extending away from the main body inner face, where the diaphragm is thickened. The reinforced portion is adapted to engage a telephone plunger when the telephone handset is placed on hook. The channel's cross section is preferably larger proximate the main body inner surface and narrower proximate the main body outer surface. An adhesive on the main body inner surface is preferably used to hold the main body to the telephone transducer housing. An additional mounting surface on the main body inner surface can be used. Where required, tabs mounted to the main body can be adapted to engage corresponding tabs on the telephone transducer housing for conducting electricity between the telephone handset and its cradle. The cushion is preferably made of a resilient, substantially sound impermeable material, such as low density, high resiliency foam, the main body and diaphragm being molded as a single piece of resilient foam. The cushion may be covered on its outer surface with vinyl or leather.

Alternatively, the invention is a cushion for application to a telephone handset, having a transducer and a transducer housing with a central sound aperture for allowing sound to pass between the user and the transducer. The cushion has a main body adapted to be attached through the transducer housing and having an inner face for contacting the transducer housing and an outer face for contacting the user. A channel defined by the main body extends through the main body between the handset sound aperture and the user, the channel increasing in cross section proximate the sound aperture and decreasing in cross section proximate the user. Preferably, the channel has a cross section proximate the sound aperture which is adapted to match the area of the handset sound aperture. The perimeter of the main body inner face is preferably adapted to match the perimeter of the transducer housing. A sound permeable diaphragm preferably extends across the channel proximate the main body outer face with a plurality of ports for allowing sound traveling through the channel to pass through the diaphragm.

BRIEF DESCRIPTION OF THE DRAWINGS

FIG. 1 is a perspective view of a cushion according to the present, invention mounted to a telephone handset;

FIG. 2 is front elevational view of the cushion of FIG. 1 mounted to a telephone handset;

FIG. 3 is a cross-sectional side view of the cushion of FIG. 2 taken along line 3—3 mounted to a telephone handset.;

FIG. 4 is a bottom elevational view of the cushion of FIG. 1 mounted to a telephone handset:

FIG. 5 is a perspective view of an alternate embodiment of the present invention;

FIG. 6 is a perspective view of a third alternate embodiment of the present invention;

FIG. 7 is a cross-sectional view of a fourth alternate embodiment of the present invention;

FIG. 8 is a front elevational view of the embodiment of FIG. 7;

FIG. 9 is a cross-sectional view of the embodiment of FIG. 8 taken along line 9—9 as applied to a telephone handset.

DETAILED DESCRIPTION OF THE INVENTION

Figure 10:
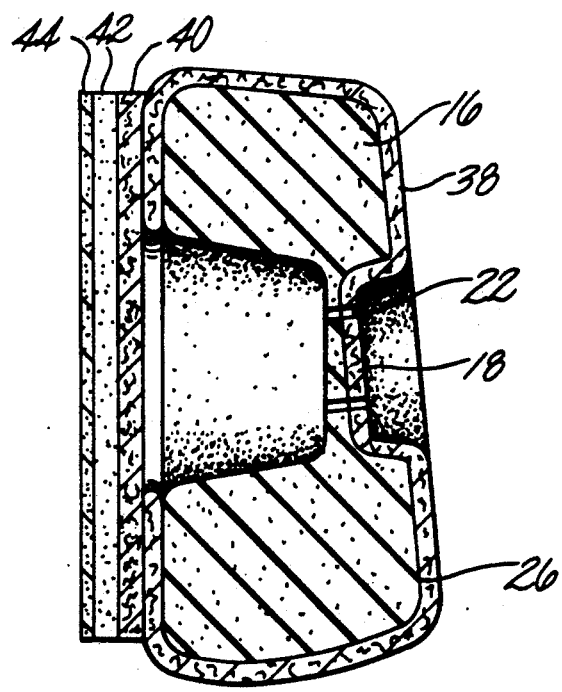
FIG. 10 is a cross-sectional view of a fifth alternate embodiment of the present invention.

A cushion according to the present invention has a main body 16, which surrounds a recessed central diaphragm 18. The diaphragm has a set of ports 20 and a central bulge 22. As best seen in FIG. 3, a central channel 24 within the main body 16 is covered by the diaphragm 18 which extends all the way across the central channel 24. As shown in FIGS. 1, 2, 3 and 4, the cushion is adapted to be mounted on a telephone handset 2. The cushion has an outer face 26 which contacts the telephone user's ear and an inner face 28 which contacts the telephone handset. The cushion's outside perimeter is adapted to match the outside perimeter of the handset's receiver housing 3 or transmitter housing 4 to form a flush continuing surface from the handset to the outer face 26 of the cushion's main body see e.g. FIGS. 1, 3 and 4. The main body inner face 28, is adapted to fit flush against and roughly match the shape of the telephone handset's receiver or transmitter housing. This not only enhances the aesthetic appeal of the cushion but allows it to fit in cradles designed for the telephone handset. Since, in most telephone handsets, the receiver and transmitter have the same shape, a cushion adapted for use with a particular handset's receiver may also be used with the handset's transmitter.

As is well known, a telephone handset's transmitter or receiver typically has a transducer 5 such as a microphone or speaker, respectively, which sits within the transmitter 3 or receiver housing 4. The housing forms the exterior surface of the transmitter or receiver. In the description, the cushion will be described as it relates to application to a handset receiver. However, it should be understood that the cushion may be applied equally well to a handset transmitter and that most of the same functional considerations apply.

The cushion of FIGS. 1, 2, 3 and 4 is adapted to be placed on a handset that has a relatively square receiver. However, as with most receivers, sound typically emanates from the speaker through a round set of holes or sound apertures 6 in the middle of the speaker housing. Accordingly, the sound channel 24 and the diaphragm 18 have a round cross section. At the inner face of the cushion's main body, this round cross section is designed to match the area of the sound apertures in the receiver speaker housing through which the sound emanates. The channel's cross section then narrows as the channel extends outward toward the main body outer surface 26. The channel guides and funnels the sound directly toward the telephone user's ear which normally has a much smaller sound opening than the receiver. If the area of the sound aperture were rectangular or elliptical, the sound channel and diaphragm is preferably made rectangular or elliptical to match.

As sound emanates from the sound apertures and the receiver toward the user's ear, it meets the diaphragm and would normally be inhibited. Therefore, there are a plurality of ports 20 in the diaphragm. These are preferably simple molded holes punched through the diaphragm material. However, if desired, these holes can be covered with some sort of sound filtering material or have a specific shape to achieve a special acoustic effect. Alternatively, the diaphragm may be constructed from a more sound permeable material so that the ports are not necessary.

Placing a cushion over the receiver provides many benefits. One benefit is that the telephone receiver is made more comfortable. Telephone handsets are typically made of a hard plastic material which is tiresome to hold against the ear. The cushion of the present invention is preferably made of a low density, high resiliency flexible skinned foam which easily conforms to approximate the shape of a user's ear and absorbs much of the pressure of the user pressing the receiver against his ear. The foam's skin makes the cushion easier to clean. The cushion also lengthens the telephone handset receiver. This can in many telephone handset designs make the handset more comfortable to cradle between a user's shoulder and his ear, making hands-free operation of the telephone more convenient.

The cushion also has several acoustic advantages. First, the cushion improves coupling between the user's ear and the receiver. Preferably, the cushion is molded from a foam which is substantially impermeable to sound. When the cushion is pressed against the user's ear, it flexes and compresses to seal acoustically against the user's ear. The seal formed is much more effective than that of the hard plastic surface of the telephone handset which requires the user's ear to do all of the flexing. The improved coupling reduces the amount of sound coming into the ear from other sources, making it easier for the user to hear sound coming through the sound channel 24.

The cushion also helps to channel sound coming from the receiver more directly into the user's ear. Because the sound channel is funnel shaped, it takes the large dispersion pattern of the receiver's sound aperture and funnels it down to enter directly into the user's ear channel, effectively increasing the volume of sound directed toward the user's ear.

The diaphragm, which extends completely across the sound channel, serves to dampen the sound coming out of the receiver's sound aperture. By restricting the sound coming through the sound channel to the ports in the diaphragm and providing an acoustically absorbent, but sound impermeable channel, much of the harshness of telephone voices is reduced. This allows the telephone to be used for a much longer period without fatiguing the user's ears. While normally the sound volume reaching the user's ear is diminished by the diaphragm, voices on the telephone are easier to hear because of the improved coupling and the damping effect. The cushion also has sanitary benefits in that it can be applied to public telephones to protect the user's ear from any microorganisms that may be on the public telephone handset receiver or transmitter.

It is anticipated that most users will prefer to apply the cushion of the present invention to a single telephone handset and leave it there permanently or until it requires replacement due to wear. Accordingly, it is important that the telephone remain fully functioning even with the cushion applied. Many telephones are taken off hook when the telephone receiver pushes against a plunger in the telephone base. Many of these plungers contact the receiver near its sound apertures, i.e. near the center of the receiver's outer face. If the cushion did not include the diaphragm, there would be nothing to push against the plunger and the telephone could not be hung up. In the embodiments shown in the drawings, the diaphragm is, therefore, placed close to the main body's outer surface so that when the telephone handset is hung up, a plunger designed to contact a central area of the receiver's outer surface will contact the diaphragm and be activated instead of entering the hole and leaving the telephone off hook. The diaphragm may also be located closer to or flush with the main body's outer face 26 if desired.

The diaphragm includes a bulge 22, see, e.g., FIGS. 3 and 9, which is a thickening in the center of the diaphragm to strengthen the diaphragm so that it can more effectively endure the pressure of the plunger against it. While the bulge is shown as being round and centrally located, a variety of other arrangements can be provided. In addition, if the cushion is adapted for a telephone that does not have a central plunger, the diaphragm may be moved further back in the sound channel toward the main body's inner face 28 or removed altogether.

A wall mounted telephone base typically uses a protruding lip on the bottom surface of the handset receiver's cradle (not shown), which engages a groove 30 in the bottom of the telephone receiver to hold the handset in the cradle. See, e.g., FIGS. 1, 3 and 4. In some applications, the cushion can simply be made soft enough so that the telephone's protruding lip extends into the cushion and holds the handset in place on the wall mount base. However, this will not always be sufficient. Accordingly, it is preferred to provide a corresponding, matching groove 32 on the underside of the cushion. The lip on the telephone base then sits within the groove 32 in the cushion just as it would in the groove of the telephone receiver and the telephone handset is held as securely as it would be without the cushion. The shape and location of the groove can be modified to match any existing telephone design.

The present invention can be modified to fit a variety of telephone handsets, whether the handset receiver and transmitter are round or any variety of rectangular shapes. The angle of the side walls of the cushion can also be varied to match the shape of the transmitter and receiver. If necessary, a different cushion can be used for the receiver than for the transmitter. Variations in the shape of a cushion constructed according to the present invention are illustrated in FIGS. 5 through 9.

FIGS. 7, 8 and 9 show an embodiment of the invention for use with some cordless telephones. In some cordless telephones, the telephone handset is battery powered and sends signals through an antenna to the telephone base. The batteries in the handset are recharged when the handset is returned to its base. This is frequently done through contact plates 35 on the handset receiver to. Placing a cushion over the end of the receiver lifts the receiver's contact plates away from the electric current supplying pins on the telephone base (not shown), preventing the telephone handset from being recharged. This can be overcome by placing electrically conducting tabs 34 on the cushion. These tabs engage the pins on the telephone base just as the contact plates on the receiver would and conduct the electricity from those pins to the contact plates on the telephone receiver, effectively bridging the gap between the receiver and the recharging pins created by the cushion. A variety of other modifications can be applied to the cushion shown in FIGS. 1–9 to adapt it to the peculiarities of specific applications.

In the embodiments of FIGS. 1–9, the cushion is preferably molded from a single piece of foam, although other materials may be used. On the inner face of the main body 28, a self-adhesive backing is preferably supplied so that the cushion is mounted to the telephone by peeling off a protective layer and pressing the cushion against the handset receiver or transmitter. With conventional low density, high resiliency foams, no additional structure need normally be supplied. However, the present invention may be constructed in a variety of other ways. One such alternative is illustrated in FIG. 10.

In the embodiment of FIG. 10, the main body 16 is still made of a low density, high resiliency foam, although other materials may be used. The main body 16 is encased by a covering 38. The covering may be made from vinyl, leather, fabric or any other material. The covering gives the cushion a distinctive appearance, which can either complement some other decor or simply give the unit a luxury appearance or feel. Alternatively, an easily cleaned or disposable material may be chosen to enhance the cushion's sanitary usefulness. The covering can extend over the diaphragm 18 as shown in FIG. 10, including holes for the sound to come through, or it may be limited to the annular main body. The covering may be molded onto the main body, glued to the main body or fastened in any other way.

A cushion having the covering of FIG. 10 may be mounted directly to a receiver as illustrated for the cushion without a covering in FIGS. 1, 2, 3 and 4, or it may incorporate a more complex mounting structure as shown in FIG. 10. Any of the cushions of FIGS. 1–9 may also be adapted to be used with the mounting structure shown in FIG. 10. This mounting structure has a mounting plate 40 applied to the main body inner face which may be made of cardboard, plastic or some other semirigid material. A double-faced tape or double-sided adhesive 42 is applied to the backing for holding the cushion onto a telephone handset. The cushion is installed by removing the peel-off tape strip 44 from the adhesive or tape, then the backing with adhesive is pressed against the telephone receiver or transmitter to hold it in place.

A variety of other mounting arrangements may also be provided. For example, a mounting ring can be attached to the inner surface of the cushion. The cushion would then be installed by snapping the mounting ring over the outside edge of the handset's receiver or transmitter. Alternatively, a strap can be provided which will loop around the back of the telephone handset to hold the cushion in place. The strap can be made of an elastic material or belt-type buckles or velcro closures can be provided to adjust the size of the strap to match a particular telephone handset.

While only a few embodiments have been described above, it will be understood by those skilled in the art that a variety of modifications and adaptations can be applied to the described embodiments without departing from the spirit and scope of the present invention. The inventor intends in no way to limit the invention to the embodiments shown and described.

What is claimed is:

1. An ear cushion for application to a telephone handset having a sound generating transducer and a transducer housing registrable with an ear of a user, the housing having an outer surface in which is a sound aperture for allowing sound to pass to the user from the transducer, the cushion comprising:
   a main body of resilient foam material adapted at an inner face thereof to be attached to the outer surface of the transducer housing for covering the outer surface around the sound aperture, the inner face of said main body having an outline configuration which corresponds substantially to the outline configuration of the outer surface of said transducer housing in which the sound aperture is present, the cushion body having an outer face for facing the user and a channel through the body between the inner and outer faces thereof, the channel having an opening in the inner face sized to substantially match the sound aperture, the cushion body defining a diaphragm extending across the channel between the body inner and outer faces and having a plurality of ports therethrough for allowing sound travelling through the channel to pass through the diaphragm.

2. The cushion of claim 1 wherein the diaphragm is proximate the outer face of said main body.

3. The cushion of claim 1 comprising an adhesive on the inner face of said main body for holding the main body to the transducer housing of said telephone handset.

4. The cushion of claim 1 comprising a cover for covering the main body.

5. The cushion of claim 1 in which a central portion of the diaphragm is reinforced by having increased thickness in a direction toward the outer face, of said main body said centeral portion of the diaphragm being engagable with a telephone plunger when the telephone handset to which the cushion is applied is placed on hook.

6. The cushion of claim 1 in which the main body has an edge face between the inner and outer faces of the body at a location on the body which faces toward a mouthpiece of said telephone handset upon application of the body to the transducer housing of said telephone handset, and a recess defined in the edge face of said main body.

7. A cushion for application to a telephone handset having a transducer and a transducer housing, the housing having an outer surface in which is a sound aperture for allowing sound to pass to a user from the transducer, the cushion comprising:

a main body adapted to be attached to the transducer housing, the main body having an inner face facing the transducer housing, an outer face facing the user and a channel extending through the main body between the inner and outer faces to guide sound between the sound aperture and the user through the main body; and a diaphragm extending across the channel having a plurality of ports for allowing sound traveling through the channel to pass through the diaphragm, a central portion of the diaphragm comprising a reinforced portion adapted to engage a telephone plunger when the telephone handset is placed on hook.

8. A cushion for application to a telephone handset having a transducer and a transducer housing, the housing having electrically conductive plates and a sound aperture for allowing sound to pass to a user from the transducer, the cushion comprising:

a main body adapted to be attached to the transducer housing, the main body having an inner face facing the transducer housing, an outer face facing the user and a channel extending through the main body between the inner and outer faces of the body to guide sound between the sound aperture and the user through the main body; and electrically conductive tabs mounted to the main body, adapted to engage the corresponding electrically conductive plates on the transducer housing, for conducting electricity to the telephone handset.

* * * * *